(12) United States Patent
Park

(10) Patent No.: US 7,896,447 B2
(45) Date of Patent: Mar. 1, 2011

(54) NON LEAK CHECK VALVE TYPED TRACTION CONTROL VALVE

(75) Inventor: Sungjun Park, Gyeonggi-Do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 727 days.

(21) Appl. No.: 11/860,092

(22) Filed: Sep. 24, 2007

(65) Prior Publication Data

US 2008/0315680 A1 Dec. 25, 2008

(30) Foreign Application Priority Data

Jun. 19, 2007 (KR) .................. 10-2007-0059760

(51) Int. Cl.
*B60T 8/34* (2006.01)
(52) U.S. Cl. ................... 303/119.2; 303/113.2
(58) Field of Classification Search ............... 303/119.1, 303/119.2, 113.1, 113.2, 116.1; 251/129.02, 251/129.15, 129.19
See application file for complete search history.

(56) References Cited

U.S. PATENT DOCUMENTS

| | | | | |
|---|---|---|---|---|
| 5,167,442 A | * | 12/1992 | Alaze et al. | 251/129.02 |
| 5,333,836 A | * | 8/1994 | Fukuyo et al. | 251/129.15 |
| 5,538,336 A | * | 7/1996 | Reuter et al. | 303/119.2 |
| 5,626,326 A | * | 5/1997 | Goossens et al. | 251/129.15 |
| 5,669,412 A | | 9/1997 | Scott | |
| 5,853,017 A | * | 12/1998 | Volz et al. | 251/129.15 |
| 5,984,263 A | * | 11/1999 | Hosoya | 251/129.15 |
| 6,189,983 B1 | * | 2/2001 | Volz et al. | 303/119.2 |
| 6,382,250 B1 | | 5/2002 | Gruschwitz et al. | |
| 6,840,499 B2 | | 1/2005 | Ahn | |
| 6,846,049 B2 | * | 1/2005 | Obersteiner et al. | 303/119.2 |
| 6,918,570 B2 | | 7/2005 | Ahn | |
| 2002/0112762 A1 | | 8/2002 | Schuller et al. | |
| 2002/0189694 A1 | | 12/2002 | Katayama et al. | |

FOREIGN PATENT DOCUMENTS

JP 2006118721 5/2006

OTHER PUBLICATIONS

English language Abstract of JP 2006-118721.

* cited by examiner

*Primary Examiner* — Thomas J Williams
(74) *Attorney, Agent, or Firm* — Greenblum & Bernstein P.L.C.

(57) ABSTRACT

The present invention provides a non leak check valve typed traction control valve. A low pressure check valve 8, which is provided in a pressure rise channel independent of a main oil passage of a TCV (Traction Control Valve), is opened during the normal braking when a driver operates a brake. Accordingly, oil pressure corresponding to the degree of braking is quickly provided. Further, when the TCS (ESP) is operated on the basis of signals from various sensors for the purpose of stably driving a vehicle even though the brake is not operated, the low pressure check valve provides an excellent airtight seal against the pressure rise channel. Therefore, pressure capable of controlling a wheel cylinder is sufficiently maintained at low pressure (10 bar or less).

16 Claims, 4 Drawing Sheets

(a)

(b)

NON LEAK CHECK VALVE TYPED TRACTION CONTROL VALVE

CROSS-REFERENCE TO RELATED APPLICATIONS

The present application is based on, and claims priority from, Korean Application Serial Number 10-2007-0059760 filed on Jun. 19, 2007, the disclosure of which is hereby incorporated by reference herein in its entirety.

FIELD OF THE INVENTION

The present invention relates to a traction control valve, and more particularly, to a traction control valve with a check valve for preventing leakage during the operation of a TCS (ESP).

BACKGROUND OF THE INVENTION

In general, a brake system increases a force, which is applied to a brake pedal by a driver, to brake a moving vehicle. Since the brake system simply stops a rotating wheel to prevent the wheel from being rotated, it is difficult to obtain an optimum braking performance corresponding to running conditions of a vehicle and road conditions.

An anti lock brake system, which appropriately adjusts braking pressure applied to the wheel on the basis of a slip rate calculated from wheel speed so as to prevent the wheel from being locked, or a traction control system is used to overcome the limitation of the above-mentioned simple brake system, which makes it possible to improve the stability of a vehicle.

In particular, a TCS system prevents a vehicle from being unexpectedly rotated (for example, on an icy road) while pumping oil from a master cylinder to provide braking pressure to a wheel independent of a brake line that is provided between a master cylinder and a wheel and supplies braking pressure. In this case, a traction control valve (TCV) is used to form oil passages between the master cylinder and a pump and between the master cylinder and a wheel cylinder.

That is, when the TCS (or ESP: Electronic Stability Program) system is operated, the TCV controls the flow of brake oil between the master cylinder and an oil pump, and between the master cylinder and a wheel cylinder provided in a wheel. Accordingly, the TCV controls oversteering or understeering corresponding to friction between a tire and a road surface, and improves the stability and steerability of a vehicle.

Further, the TCV should have a quick pressure rising function during normal braking, a quick pressure releasing function during a brake release, and a pressure maintaining function capable of controlling the wheel cylinder during the operation of the TCS (or ESP) while closing a channel between the master cylinder and the wheel cylinder.

For this reason, a pressure rise channel with a check valve is further formed in the TCV so that braking oil pressure can be quickly increased from the master cylinder to the wheel cylinder. In general, the TCV is operated while pressure of 100 bar or less is generated.

As described above, the TCV should quickly induce oil flow in order to always have excellent responsiveness, and sufficiently maintain high pressure and low pressure. In particular, there is a demand for the following TCV. The TCV maintains required pressure in a valve body and does not decrease responsiveness during a low pressure control where a channel corresponding to the master cylinder is closed and a wheel cylinder is controlled when the brake pedal is not operated and the TCS (ESP) is operated.

SUMMARY OF THE INVENTION

Embodiments of the present invention help overcome the drawbacks and provide a non leak check valve typed traction control valve where a check valve can allow a traction control valve to perform a low pressure control. The non leak check valve typed traction control valve (TCV) includes a check valve. The check valve controls the pressure of oil, which passes through channels formed between a master cylinder and a pump and between the master cylinder and a wheel cylinder. The check valve is provided on a pressure rise channel independent of a main flow channel of a valve body. Accordingly, pressure is quickly increased from the master cylinder to the wheel cylinder during the operation of a brake pedal, and leakage is prevented during the operation of a TCS (ESP) so that oil does not leak toward a pressure rise channel.

Further, according to an embodiment of the present invention, a check valve, which prevents oil from leaking from a valve body of a TCV during the operation of a TCS (ESP), is made of plastic or rubber. Therefore, it is possible to reduce the entire weight of the TCV and to improve operational responsiveness.

According to an aspect of the present invention, a non leak check valve typed traction control valve includes a plunger, a valve body, a plunger seat, a supporting member, a spring, a main plunger valve, a low pressure check valve, and a front filter. The plunger is operated by an armature surrounded by a coil to which electric power is applied during the operation, and includes a contact portion so as to open or close a channel. The valve body includes a flow hole formed in a radial direction and a pressure rise channel formed in an axial direction parallel to a main flow channel formed therein. Oil flows from a master cylinder to the flow hole when the valve body is press-fitted into a pump housing, and the plunger is received in a chamber of the valve body. The plunger seat is received in the chamber of the valve body and forms the main flow channel in an axial direction therein. The supporting member is inserted into the valve body so as to be adjacent to the plunger seat and supports the plunger seat. The spring elastically supports the plunger against the plunger seat. The main plunger valve comes in contact with or is separated from the contact portion of the plunger or the plunger seat to open or close the main flow channel. The low pressure check valve closes the portion of the valve body facing the pressure rise channel in order to close a channel corresponding to the master cylinder and maintain pressure capable of controlling a wheel cylinder during the operation of TCS (ESP). The front filter is fixed to an end of the valve body, filters off impurities from oil, and is press-fitted and closely supported by the pump housing.

The valve body may include an extension body, a channel forming body, a flange, a flow hole, and a pressure rise channel. The extension body is fixed to the housing surrounding the armature around which a coil is wound. The channel forming body is integrally formed with the extension body and press-fitted into the pump housing. The flange is formed between the extension body and the channel forming body, has a relatively large diameter, and is fixed to the pump housing. The flow hole is formed in the channel forming body in a radial direction so as to communicate with a chamber that is formed in the extension body in an axial direction so as to pass through a central portion of the channel forming body. The pressure rise channel is perpendicular to the flow hole and formed in an axial direction of the valve body.

The valve body may include a first fixation portion and a second fixation portion. The first fixation portion is engaged with a first fixation forming portion that is formed at an inlet of a chamfer formed in the pump housing due to the plastic deformation of an inner surface of the chamfer. The second fixation portion is composed of a plurality of grooves, which is formed on the outer periphery of the valve body at predetermined intervals, so as to be engaged with a second fixation forming portion that is formed to be spaced from the first fixation portion due to the plastic deformation of the inner surface of the chamfer.

The chamfer of the pump housing may include a supporting portion formed to be inclined inward at a lower edge thereof, so that a lower portion of the front filter inserted into the chamfer comes in close contact with the pump housing when the valve body of a solenoid valve is fitted to the pump housing.

The plunger seat may include a channel forming body and an extension contact portion. The channel forming body has a chamber, which is a cavity into which the oil flows from the master cylinder. The extension contact portion protrudes from an end of the channel forming body and has an inflow hole communicating with the chamber.

The main plunger valve may be received in a receiving groove formed at an end of the contact portion of the plunger, and may be formed of a ball that forms a channel depending on the contact degree between the plunger seat and the ball.

The low pressure check valve may include a body shaft, a fixation body, and a sealing cap. The body shaft is inserted into the pressure rise channel of the valve body so as to form a channel space. The fixation body forms one end of the body shaft and has a larger diameter than the body shaft. The sealing cap forms a sealing contact surface coming in close contact with the low pressure check valve receiving groove, which has a large diameter at an end of the pressure rise channel.

The body shaft and the fixation body integrally formed with the body shaft may be made of plastic, and the sealing cap surrounding the fixation body may be made of rubber.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
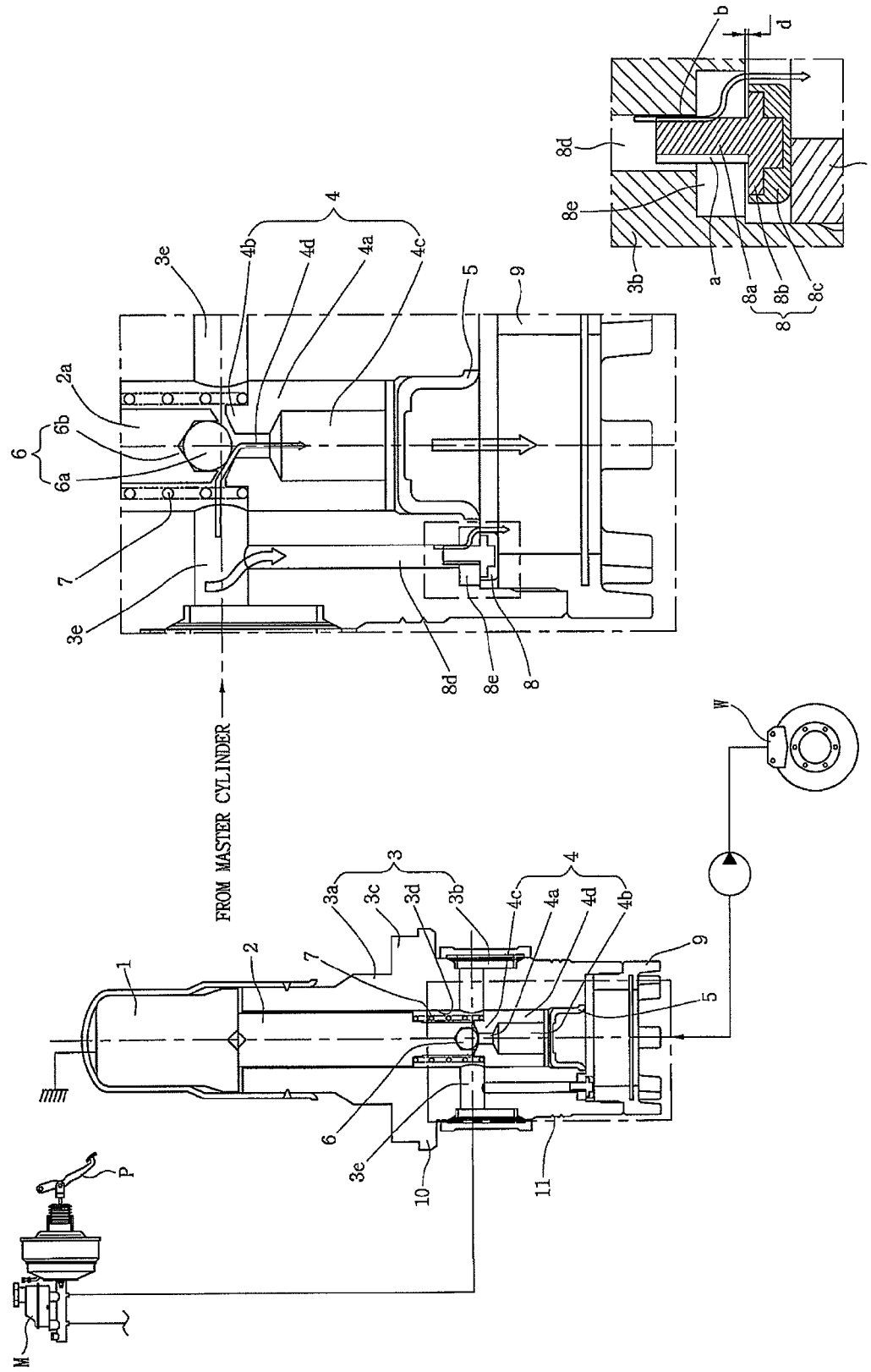
FIG. 1 is a view showing the structure of a non leak check valve typed traction control valve according to an embodiment of the present invention.

FIG. 1 is a view showing a non leak check valve typed traction control valve according to an embodiment of the present invention. A traction control valve (TCV) according to an embodiment of the present invention controls oil pressure so that braking oil pressure generated by a master cylinder M is applied to a wheel cylinder W provided in a wheel by using a booster for increasing a force applied by a brake pedal P and reversely applied to the master cylinder.

The traction control valve includes a plunger 2, a valve body 3, a plunger seat 4, a main plunger valve 6, and a low pressure check valve 8. Plunger 2 opens or closes a channel on the basis of control signals of a controller. Valve body 3 receives plunger 2, forms an oil passage of an oil pressure line, is press-fitted into a pump housing PH, and forms a pressure rise channel 8$d$ in an axial direction parallel to a main flow channel formed therein. Plunger seat 4 forms a flow passage by using an oil pressure applied in valve body 3. A main plunger valve 6 is provided between plunger 2 and plunger seat 4, and comes in contact with or is separated from the plunger or the plunger seat so as to open or close the main flow channel. Low pressure check valve 8 closes the portion of valve body 3 facing pressure rise channel 8$d$ in order to close a channel corresponding to master cylinder M and maintain pressure capable of controlling wheel cylinder W during the operation of TCS (ESP).

The TCV further includes a supporting member 5 and a front filter 9. Supporting member 5 is inserted into a chamber 3$d$ of valve body 3 so as to be adjacent to plunger seat 4, supports plunger seat 4, and limits the motion of the plunger seat. Front filter 9 is fixed to an end of valve body 3, filters off impurities from oil, and is press-fitted and closely supported by pump housing PH.

In this case, a filter body of front filter 9 is made by injection molding.

Further, plunger 2 has a contact portion 2$a$ at an end thereof so as to open or close a channel. Plunger 2 is actuated by an armature 1 surrounded by a coil to which electric power is applied on the basis of the control signals of the controller.

Meanwhile, valve body 3 forms a chamber 3$d$ in which plunger 2 is received. Further, the valve body forms a flow hole 3$e$, which is an oil passage of a braking oil pressure line between master cylinder M and wheel cylinder W, in a radial direction, and is press-fitted into pump housing PH.

That is, valve body 3 includes a channel forming body 3$b$. Channel forming body 3$b$ is connected to an extension body 3$a$ fixed to a housing that surrounds armature 1, and is press-fitted into pump housing PH. Further, the valve body includes a flange 3$c$ that is formed between extension body 3$a$ and channel forming body 3$b$ and has a relatively large diameter, and is fixed to pump housing PH.

In addition, valve body 3 includes a chamber 3$d$ that is formed in extension body 3$a$ in an axial direction of the valve body so as to pass through a central portion of channel forming body 3$b$. Chamber 3$d$ communicates with flow hole 3$e$ that is formed in channel forming body 3$b$ in a radial direction. Flow hole 3$e$ forms a passage into which oil flows from master cylinder M.

Further, a pressure rise channel 8$d$, which is independent of flow hole 3$e$ and is perpendicular to flow hole 3$e$, is formed in valve body 3 in an axial direction of the valve body so that oil pressure is quickly increased during the normal braking caused by the operation of brake pedal P.

Plunger seat 4 is received in chamber 3$d$ of valve body 3, and allows oil flowing from master cylinder M to flow in an axial direction of valve body 3. For this purpose, plunger seat 4 includes a channel forming body 4$a$ having a chamber 4$c$, and an extension contact portion 4$b$ having an inflow hole 4$d$. Chamber 4$c$ is a cavity into which the oil flows. The extension contact portion protrudes from the end of channel forming body 4$a$ and has inflow hole 4$d$ communicating with chamber 4$c$.

Main plunger valve 6 is provided between plunger 2 and plunger seat 4, which are elastically supported against each other by a spring 7. Main plunger valve 6 comes in contact with or is separated from contact portion 2a of plunger 2 or plunger seat 4 to open or close the channel so that oil flowing through valve body 3 can flow to wheel cylinder W through plunger seat 4.

For this purpose, main plunger valve 6 is received in a receiving groove 6b formed at an end of contact portion 2a of plunger 2, and is composed of a ball 6a that forms a channel depending on the contact degree between plunger seat 4 and the ball. Contact portions between plunger seat 4 and contact portion 2a of plunger 2 receiving ball 6a are formed in an arc shape in order to increase the contacting force therebetween.

In this case, the shapes of the contact portions may be contrary to each other. For example, if contact portion 2a of plunger 2 has a convex arc shape, the contact portion of plunger seat 4 corresponding to contact portion 2a has a concave arc shape.

Further, low pressure check valve 8 is connected to pressure rise channel 8d so as to open or close pressure rise channel 8d. One end of the pressure rise channel communicates with flow hole 3e of valve body 3 so as to be perpendicular to the flow hole, and the other end of the pressure rise channel passes through valve body 3 in an axial direction of the valve body.

Figure 2:
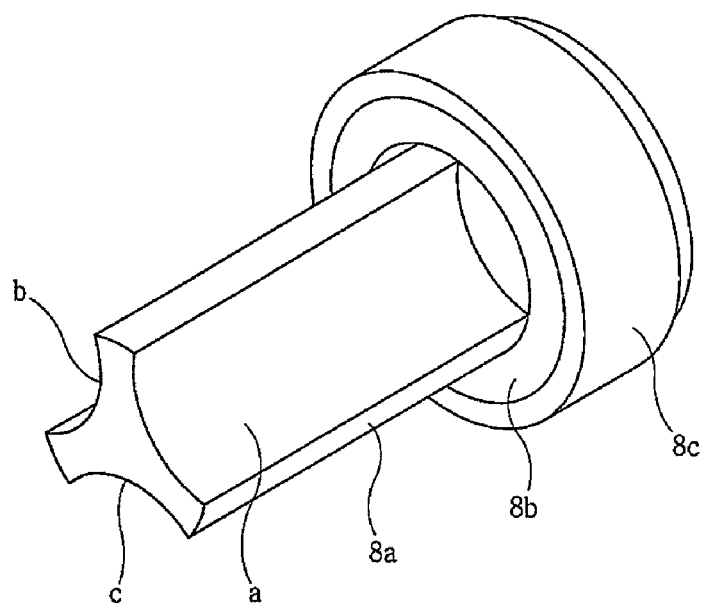
FIGS. 2A and 2B are views showing a check valve according to the embodiment of the present invention, which prevents leakage at low pressure.
Figure 2:
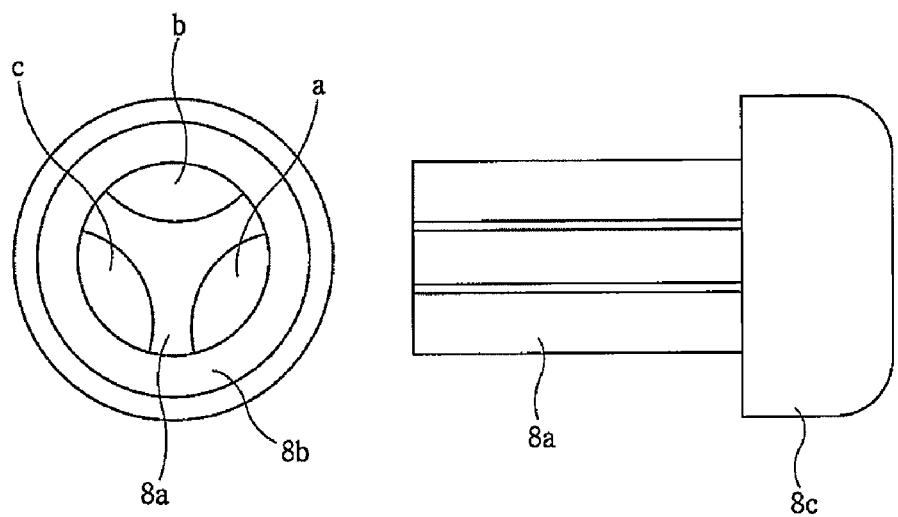

For this purpose, as shown in FIGS. 2A and 2B, low pressure check valve 8 includes a body shaft 8a, a fixation body 8b, and a sealing cap 8c. Body shaft 8a is inserted into pressure rise channel 8d so as to form a channel space. Fixation body 8b forms one end of body shaft 8a, and has a larger diameter than body shaft 8a. Sealing cap 8c surrounds fixation body 8b and is fixed to the fixation body. Further, the sealing cap forms a sealing contact surface K that comes in close contact with low pressure check valve receiving groove 8e when pressure rise channel 8d is closed.

In this case, body shaft 8a has axial channels formed by cutting body shaft 8a in a longitudinal direction so that a channel space is formed in pressure rise channel 8d. Axial channels a, b, and c are formed at intervals of about 120° at three positions, and forms a large channel space as a whole.

Further, low pressure check valve receiving groove 8e, which is formed in valve body 3 and has a larger diameter than pressure rise channel 8d, has a larger diameter than sealing cap 8c of low pressure check valve 8, which makes it possible to quickly discharge oil.

In order to reduce the entire weight of the TCV, body shaft 8a of low pressure check valve 8 and fixation body 8b integrally formed with body shaft 8a are made of plastic and sealing cap 8c surrounding fixation body 8b is made of rubber.

Figure 3:
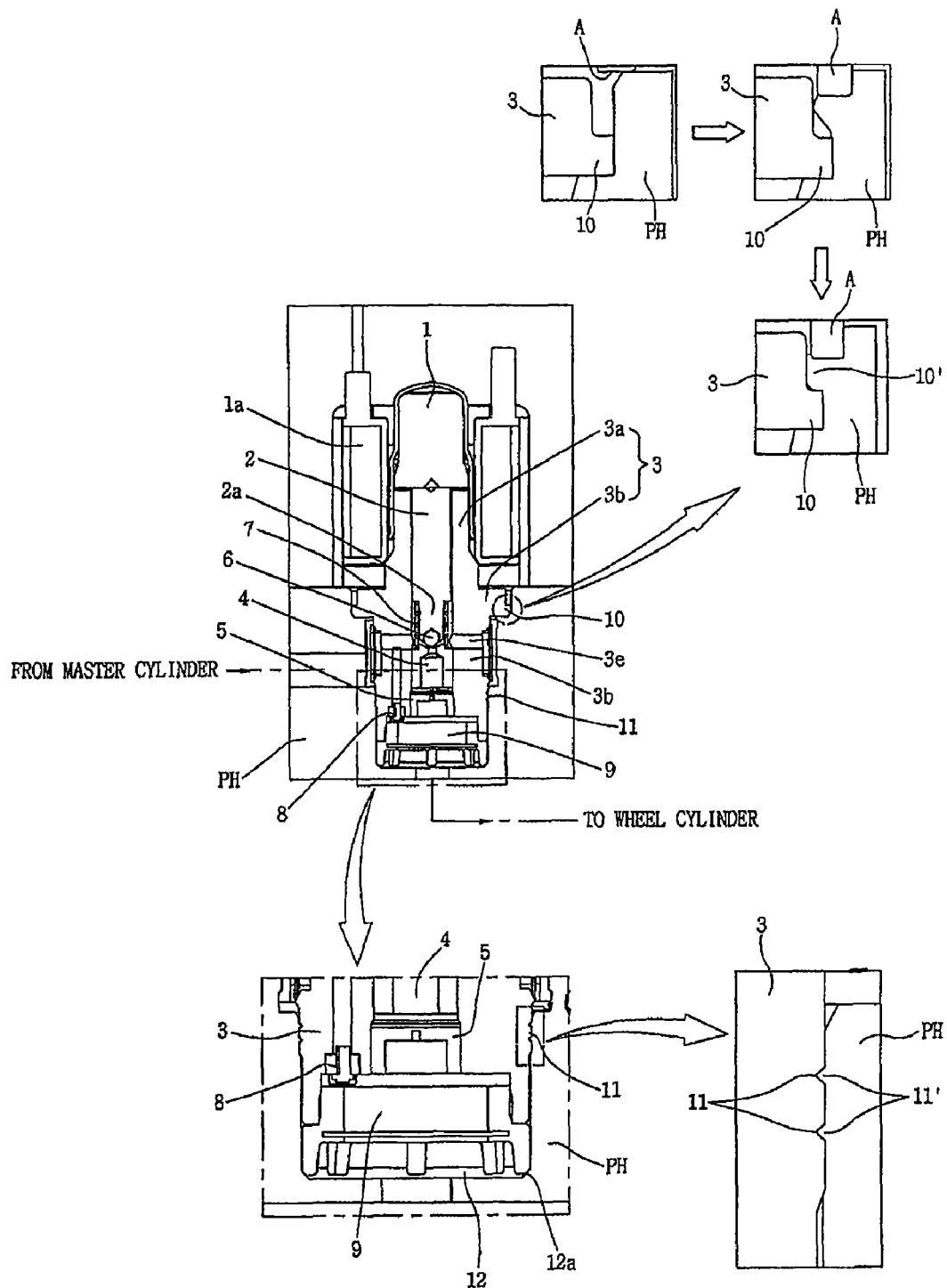
FIG. 3 is a view showing that the non leak check valve typed traction control valve according to the embodiment of the present invention is press-fitted into a pump housing.

Meanwhile, when being staked and press-fitted into pump housing PH, the TCV forms a multiple sealing structure. For this purpose, when being staked and press-fitted into an inlet of pump housing PH as shown in FIG. 3, a first fixation portion 10 is plastically deformed to improve an airtight seal and a fixing force between pump housing PH and valve body 3.

In addition, when being press-fitted into pump housing PH, second fixation portion 11, which is formed to be spaced from the first fixation portion plastically deformed at an inlet of pump housing PH, is also plastically deformed to improve an airtight seal and a fixing force between pump housing PH and valve body 3.

In this case, second fixation portion 11 is composed of a plurality of grooves that is formed on the outer periphery of channel forming body 3b of valve body 3 at predetermined intervals. Each of the grooves may have various shapes. However, it is preferable that each of the grooves have a V-shaped cross section.

As described above, a difference in strength between materials is used to improve the airtight seal of valve body 3 by using the plastic deformation of first and second fixation portions 10 and 11. For example, the portions of pump housing PH to which first and second fixation portions 10 and 11 are press-fitted are made of aluminum that has lower yield strength than first and second fixation portions 10 and 11.

Further, channel forming body 3b of valve body 3 is divided into a portion having second fixation portion 11 and a portion not having the second fixation portion. The portion, which does not have second fixation portion 11 and is inserted into pump housing PH, of the channel forming body has a smaller diameter than the portion, which has second fixation portion 11, of channel forming body 3b.

When the channel forming body is press-fitted into a space corresponding to a chamfer 12 in pump housing PH, the difference in diameter of channel forming body 3b of valve body 3 prevents chamfer 12 from being plastically deformed by the end of channel forming body 3b.

Chamfer 12 formed in pump housing PH allows the portions, which have different diameters, of valve body 3 to be fitted into the pump housing. For example, chamfer 12 has an inner diameter corresponding to flange 3c and channel forming body 3b of valve body 3, which have different diameters. The difference in diameter is formed in multi-steps corresponding to the portions to be inserted.

Further, when valve body 3 of a solenoid valve is press-fitted into pump housing PH, as shown in FIG. 3, front filter 9 comes in contact with the pump housing by an inclined supporting portion 12a formed on an inner periphery of chamfer 12 of pump housing PH that receives front filter 9 fixed to the end of valve body 3.

The contact using inclined supporting portion 12a prevents front filter 9 from being separated due to the oil pressure.

The operation of the traction control valve according to the embodiment of the present invention will be described in detail below with reference to the accompanying drawings.

According to the embodiment of the present invention, low pressure check valve 8, which is provided in pressure rise channel 8d independent of the main oil passage of the TCV (Traction Control Valve), is opened during the normal braking when a driver operates a brake. Accordingly, oil pressure corresponding to the degree of braking is quickly provided. Further, when the TCS (ESP) is operated on the basis of signals from various sensors for the purpose of stably driving a vehicle even though the brake is not operated, low pressure check valve 8 provides an excellent airtight seal against pressure rise channel 8d. Therefore, there is a characteristic in that pressure capable of controlling wheel cylinder W is maintained at low pressure (10 bar or less).

In the TCV according to the embodiment of the present invention, low pressure check valve 8, which closes the channel corresponding to master cylinder M and maintains pressure capable of controlling wheel cylinder W at low pressure (10 bar or less), is made of plastic or rubber. Therefore, there is a characteristic in that the entire weight of the TCV is reduced.

In addition, there is a characteristic in that the TCV according to the embodiment of the present invention has a structure for improving multiple airtight seal and a fixing force between pump housing PH and valve body 3 when valve body 3 is fitted into pump housing PH.

The multiple sealing structure and the fixing force improving structure, which are obtained from the structure to be fixed to pump housing PH, among the above-mentioned characteristics of the TCV include a first fixing/sealing structure and a second fixing/sealing structure as shown in FIG. 3. The first fixing/sealing structure is formed by flange 3c of valve body 3, which has a relatively large diameter and is provided between extension body 3a of valve body 3, which is fixed to plunger 2, and channel forming body 3b, which is press-fitted into pump housing PH and forms a channel. The second fixing/sealing structure is formed by channel forming body 3b press-fitted into the space corresponding to chamfer 12 of pump housing PH.

According to the first fixing/sealing structure, which is formed between flange 3c of valve body 3 and an inlet of the space corresponding to chamfer 12 of pump housing PH, when channel forming body 3b of valve body 3 is staked and press-fitted into chamfer 12 of pump housing PH, flange 3c, that is, the end of channel forming body 3b is positioned at the inlet of chamfer 12 of pump housing PH. A first fixation forming portion 10', which is formed by plastically deforming pump housing PH with a seal member A, surrounds first fixation portion 10 of flange 3c positioned as described above.

That is, while first fixation forming portion 10' is plastically deformed, the deformed portion of the pump housing fills a stepped portion between flange 3c and first fixation portion 10. Accordingly, first fixation portion 10 is engaged with first fixation forming portion 10', and first fixation portion 10 and seal member A generate a fixing force. Further, since first fixation forming portion 10' comes in close contact with the first fixation portion, the airtight seal therebetween is improved.

In this case, if pump housing PH is made of aluminum, the plastic deformation of pump housing PH is easily performed by the pressure of seal member A, which makes it possible to easily form first fixation forming portion 10'.

Further, according to the second fixing/sealing structure that is formed in channel forming body 3b of valve body 3 and the space corresponding to chamfer 12 of pump housing PH, channel forming body 3b of valve body 3, which is staked and press-fitted into the pump housing, is formed by plastically deforming the inner surface of chamfer 12 of pump housing PH with a seal member B that is provided on the plastically deformed portion.

That is, plastically deformed second fixation forming portion 11' of the inner surface of chamfer 12 fills second fixation portion 11, which has a V-shaped cross section and is formed on the outer periphery of channel forming body 3b of valve body 3. Accordingly, it is possible to improve an airtight seal and a fixing force between second fixation portion 11 formed on the outer periphery of channel forming body 3b and second fixation forming portion 11' formed on the inner surface of chamfer 12.

Further, the second fixing/sealing structure formed between channel forming body 3b of valve body 3 and chamfer 12 of pump housing PH can prevent leakage without separate sealing rings (O-rings) due to second fixation portion 11 and second fixation forming portion 11', which are engaged with each other. Therefore, the number of sealing rings for preventing leakage is reduced and a machining process for assembly of the sealing rings does not need to be performed.

Meanwhile, the end of channel forming body 3b of valve body 3 has a smaller diameter than the portion of the valve body on which second fixation portion 11 is formed. When the channel forming body is staked and press-fitted into the space corresponding to chamfer 12 of pump housing PH, the difference in diameter of channel forming body 3b prevents chamfer 12 from being plastically deformed by the end of channel forming body 3b.

Further, as shown in FIG. 3, front filter 9, which is provided in the space corresponding to chamfer 12 of pump housing PH and filters off impurities from oil, comes in contact with the pump housing by supporting portion 12a that is inclined at the end of chamfer 12 of pump housing PH to reduce a diameter thereof.

The structure for supporting front filter 9 by inclined supporting portion 12a of chamfer 12 of pump housing PH prevents the front filter from being separated due to the oil pressure, and maintains a gap so as to prevent low pressure check valve 8, which opens or closes pressure rise channel 8d formed in channel forming body 3b of valve body 3, from being separated from pressure rise channel 8d.

That is, when low pressure check valve 8 is moved to the maximum so as to open pressure rise channel 8d, as shown in FIG. 1, low pressure check valve 8 forms a channel forming gap d so that oil in pressure rise channel 8d passes through the gap.

The operation of the TCV press-fitted into pump housing PH will be described with reference to a case when oil pressure is quickly provided under high pressure corresponding to the operation (Normal Braking) of brake pedal P, and a case when oil pressure of wheel cylinder W is controlled under low pressure corresponding to the non-operation (TCS (ESP)) of the brake pedal.

First, when the brake pedal is operated, oil pressure is quickly provided from master cylinder M to wheel cylinder W. When oil flows from master cylinder M to the valve body through radial flow hole 3e of valve body 3 as shown in FIG. 1, main plunger valve 6 is separated from plunger seat 4 and the main flow channel is opened according to the actuation of magnetized armature 1 and plunger 2.

Accordingly, the oil flowing into valve body 3 simultaneously forms two flow passages, that is, a main flow passage that passes through main plunger valve 6 and is connected to valve body 3 and chamber 4c of chamber 4c, and a sub-flow passage that is parallel to the main flow passage and passes through pressure rise channel 8d formed in an axial direction of valve body 3.

As low pressure check valve 8 is opened due to the oil pressure, the main flow passage and the sub-flow passage are formed. That is, when oil, which flows to pressure rise channel 8d communicating with radial flow hole 3e of valve body 3, pushes low pressure check valve 8 toward front filter 9, low pressure check valve 8 is pushed toward front filter 9 and channel forming gap d is formed. Then, the oil is discharged through pressure rise channel 8d.

The oil quickly flows through low pressure check valve 8. As shown in FIGS. 2A and 2B, the plurality of axial channels a, b, and c, which is formed on body shaft 8a inserted into pressure rise channel 8d, enlarges the flow passage of pressure rise channel 8d. Therefore, the amount of oil passing through pressure rise channel 8d can be quickly increased.

Subsequently, the oil flowing into valve body 3 is supplied to wheel cylinder W, which is provided in the wheel, through front filter 9 so as to perform a braking operation.

Meanwhile, when the TCS (ESP) operates depending on road conditions even if brake pedal P is not operated, the TCV closes the channel corresponding to master cylinder M and performs a low pressure control capable of controlling wheel cylinder W. In this case, low pressure check valve 8 maintains a performance for preventing oil leakage by preventing leakage against pressure rise channel 8d of valve body 3. Therefore, the TCV can perform control at low pressure (about 10 bar).

Figure 4:
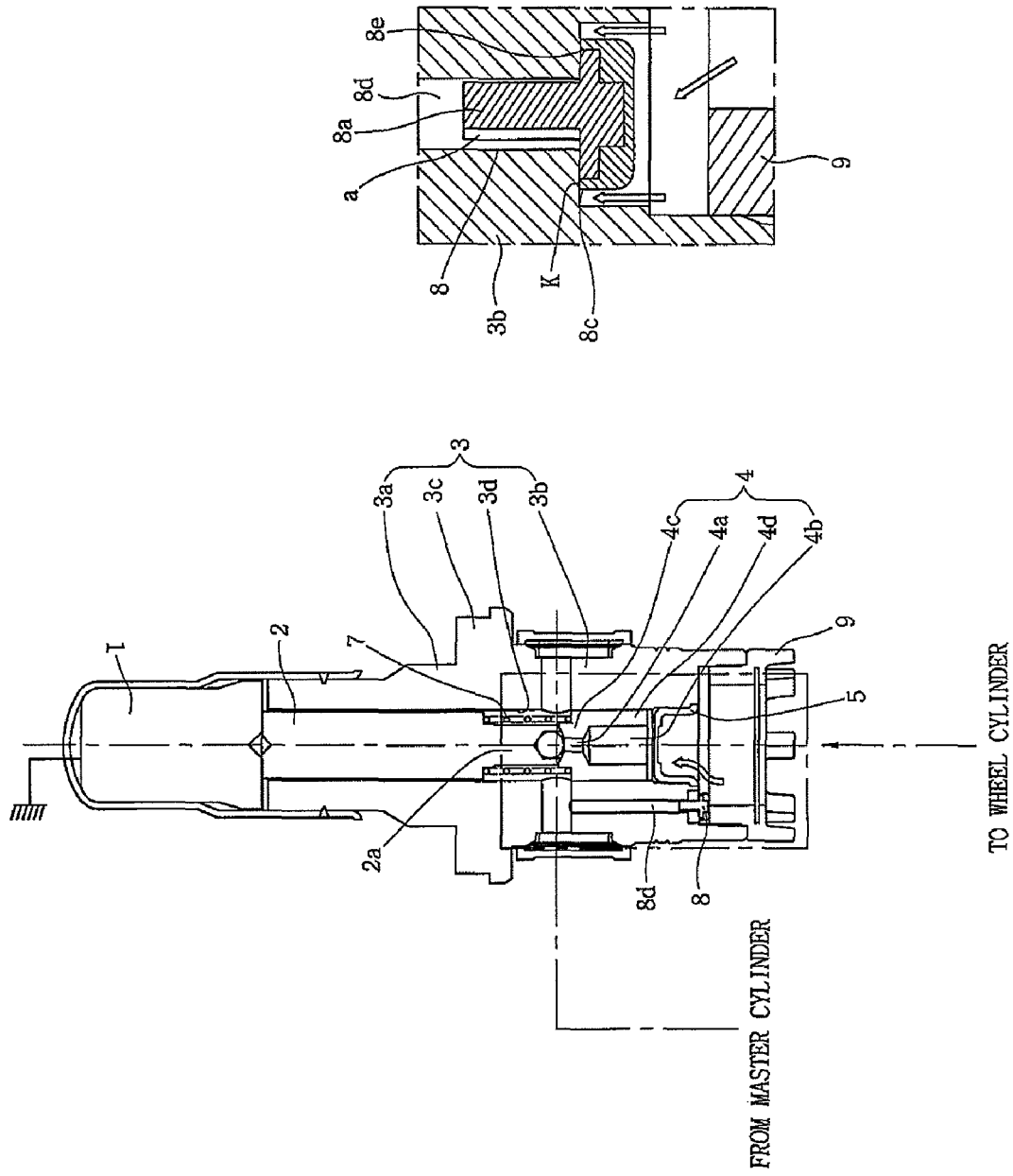
FIG. 4 is a view illustrating the actuation of the check valve of the traction control valve according to the embodiment of the present invention during the operation of a TCS (ESP).

That is, while the main flow channel formed in valve body 3 of the TCV is closed, the oil in valve body 3 is controlled as follows: when oil, which flows from wheel cylinder W to valve body 3 by the actuation of the pump, applies pressure to low pressure check valve 8 as shown in FIG. 4, low pressure check valve 8 is moved to pressure rise channel 8d and closes pressure rise channel 8d.

When sealing cap 8c of low pressure check valve 8 comes in close contact with low pressure check valve receiving groove 8e according to the movement of low pressure check valve 8 as described above, a sealing contact surface K where sealing cap 8c comes in close contact with pressure check valve receiving groove 8e is formed.

At sealing contact surface K, fixation body 8b of body shaft 8a comes in close contact with the peripheral portion of the inlet of pressure rise channel 8d, and sealing cap 8c surrounding fixation body 8b also comes in close contact with the peripheral portion of the inlet of the pressure rise channel. In this case, due to the fact that sealing cap 8c is made of rubber, as oil pressure is increased, sealing cap 8c comes in closer contact with low pressure check valve receiving groove 8e. Therefore, portion of sealing cap 8c coming in close contact with the peripheral portion of the inlet of the pressure rise channel improves an airtight seal against pressure rise channel 8d, which makes it possible to prevent oil from leaking.

As described above, low pressure check valve 8 prevents leakage so as to prevent the oil from leaking to pressure rise channel 8d. Therefore, pressure is maintained in valve body 3 and responsiveness is not decreased when the channel corresponding to master cylinder M is closed and wheel cylinder W is controlled.

Further, when being actuated, low pressure check valve 8 hardly causes noise from the contact between the low pressure check valve and valve body 3. The reason for this is that low pressure check valve 8 is made of plastic or rubber, thereby preventing noise from being generated when the low pressure check valve repeatedly comes in contact with the valve body, unlike steel.

As described above, a check valve is provided on a pressure rise channel of a traction control valve (TCV), quickly increases pressure from a master cylinder toward a wheel cylinder during the operation of a brake pedal, and prevents leakage during the operation of a TCS (ESP) so that oil does not leak toward the pressure rise channel, thereby preventing the responsiveness of the TCV from being decreased. According to the present invention, since the check valve is made of plastic or rubber, leakage is prevented during the operation of a TCS (ESP) so that oil does not leak toward a pressure rise channel. As a result, it is possible to perform a low pressure control of a TCV.

Further, according to the present invention, a check valve, which prevents oil from leaking from a valve body of a TCV during the operation of a TCS (ESP), is made of plastic or rubber. Therefore, it is possible to reduce the entire weight of the TCV and to improve operational responsiveness.

What is claimed is:

1. A non leak check valve typed traction control valve, comprising:
    a plunger that is operated by an armature and includes a contact portion so as to open or close a channel, the armature being surrounded by a coil to which electric power is applied during the operation;
    a valve body that includes a flow hole formed in a radial direction and a pressure rise channel formed in an axial direction parallel to a main flow channel formed therein, oil flowing from a master cylinder to the flow hole when the valve body is press-fitted into a pump housing, and the plunger being received in a chamber of the valve body;
    a plunger seat that is received in the chamber of the valve body and forms the main flow channel in an axial direction therein; a supporting member that is inserted into the valve body so as to be adjacent to the plunger seat and supports the plunger seat;
    a spring that elastically supports the plunger against the plunger seat;
    a main plunger valve that comes in contact with or is separated from the contact portion of the plunger or the plunger seat to open or close the main flow channel;
    a low pressure check valve that closes the portion of the valve body facing the pressure rise channel in order to close a channel corresponding to the master cylinder and maintains pressure capable of controlling a wheel cylinder during the operation of TCS (ESP), the low pressure check valve comprising:
    a body shaft that is inserted into the pressure rise channel of the valve body so as to form a channel space,
    a fixation body that forms one end of the body shaft and has a larger diameter than the body shaft, and
    a sealing cap that forms a sealing contact surface coming in close contact with a low pressure check valve receiving groove, which has a large diameter at an end of the pressure rise channel; and
    a front filter that is fixed to an end of the valve body, filters off impurities from oil, and is press-fitted and closely supported by the pump housing.

2. The non leak check valve typed traction control valve as defined in claim 1, wherein the valve body comprises:
    an extension body fixed to the housing surrounding the armature around which a coil is wound;
    a channel forming body that is integrally formed with the extension body and press-fitted into the pump housing;
    a flange that is formed between the extension body and the channel forming body, has a relatively large diameter, and is fixed to the pump housing;
    the flow hole being formed in the channel forming body in a radial direction so as to communicate with the chamber of the valve body that is formed in the extension body in an axial direction so as to pass through a central portion of the channel forming body; and
    the pressure rise channel being perpendicular to the flow hole and formed in an axial direction of the valve body.

3. The non leak check valve typed traction control valve as defined in claim 2, wherein the valve body comprises:
    a first fixation portion engaged with a first fixation forming portion that is formed at an inlet of a chamfer formed in the pump housing due to the plastic deformation of an inner surface of the chamfer; and
    a second fixation portion engaged with a second fixation forming portion that is formed to be spaced from the first fixation portion due to the plastic deformation of the inner surface of the chamfer.

4. The non leak check valve typed traction control valve as defined in claim 3, wherein a portion of the pump housing in which the chamfer is formed is made of aluminum having a lower yield strength.

5. The non leak check valve typed traction control valve as defined in claim 3, wherein the chamfer of the pump housing includes a supporting portion formed to be inclined inward at a lower edge thereof, so that a lower portion of the front filter inserted into the chamfer comes in close contact with the pump housing when the valve body of a solenoid valve is fitted to the pump housing.

6. The non leak check valve typed traction control valve as defined in claim 3, wherein first fixation portion is formed at the flange, which has a relatively large diameter, of the channel forming body of the valve body inserted into the pump housing.

7. The non leak check valve typed traction control valve as defined in claim 6, wherein the flange includes the first fixation portion having a relatively large diameter.

8. The non leak check valve typed traction control valve as defined in claim 3, wherein the second fixation portion is formed of a plurality of grooves that is formed on the outer periphery of the channel forming body of the valve body at predetermined intervals.

9. The non leak check valve typed traction control valve as defined in claim 8, wherein each of the grooves has a V-shaped cross section.

10. The non leak check valve typed traction control valve as defined in claim 8, wherein a portion, which does not have the second fixation portion, of the channel forming body has a smaller diameter than a portion, which has the second fixation portion, of the channel forming body.

11. The non leak check valve typed traction control valve as defined in claim 1, wherein the plunger seat comprises:
 a channel forming body having a chamber, which is a cavity into which the oil flows from the master cylinder; and
 an extension contact portion that protrudes from an end of the channel forming body of the plunger seat, and the extension contact portion having an inflow hole communicating with the chamber of the plunger seat.

12. The non leak check valve typed traction control valve as defined in claim 1, wherein the main plunger valve is received in a receiving groove formed at an end of the contact portion of the plunger, and is formed of a ball that forms a channel depending on the contact degree between the plunger seat and the ball.

13. The non leak check valve typed traction control valve as defined in claim 12, wherein contact portions between the plunger seat and the contact portion of the plunger receiving the ball are formed in an arc shape in order to increase contacting forces therebetween.

14. The non leak check valve typed traction control valve as defined in claim 1, wherein the body shaft has axial channels formed by cutting the body shaft in a longitudinal direction so that a channel space is formed in the pressure rise channel.

15. The non leak check valve typed traction control valve as defined in claim 14, wherein the axial channels are formed at intervals of about 120° at three positions.

16. The non leak check valve typed traction control valve as defined in claim 1, wherein the body shaft and the fixation body integrally formed with body shaft are made of plastic, and
 the sealing cap surrounding the fixation body is made of rubber.

* * * * *